(12) United States Patent
Kunkel

(10) Patent No.: US 9,394,010 B2
(45) Date of Patent: Jul. 19, 2016

(54) LOGISTICS POST

(71) Applicant: Wabash National, L.P., Lafayette, IN (US)

(72) Inventor: David P. Kunkel, Lebanon, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 14/819,881

(22) Filed: Aug. 6, 2015

(65) Prior Publication Data

US 2016/0039476 A1    Feb. 11, 2016

Related U.S. Application Data

(60) Provisional application No. 62/034,465, filed on Aug. 7, 2014.

(51) Int. Cl.
  *B62D 33/00*  (2006.01)
  *B62D 33/04*  (2006.01)
  *B60P 7/08*  (2006.01)

(52) U.S. Cl.
  CPC .............. *B62D 33/046* (2013.01); *B60P 7/0815* (2013.01)

(58) Field of Classification Search
  CPC ............................ B62D 33/044; B62D 65/10
  USPC .............................................. 296/191, 186.1
  See application file for complete search history.

(56) References Cited

U.S. PATENT DOCUMENTS

| | | | |
|---|---|---|---|
| 5,607,200 A | 3/1997 | Smidler | |
| 5,860,693 A | 1/1999 | Ehrlich | |
| 5,876,089 A | 3/1999 | Ehrlich | |
| 5,934,742 A | 8/1999 | Fenton et al. | |
| 5,938,274 A | 8/1999 | Ehrlich | |
| 5,997,076 A | 12/1999 | Ehrlich | |
| 6,199,939 B1 | 3/2001 | Ehrlich | |
| 6,220,651 B1 | 4/2001 | Ehrlich | |
| 6,412,854 B2 | 7/2002 | Ehrlich | |
| 6,986,546 B2 | 1/2006 | Ehrlich | |
| 7,069,702 B2 | 7/2006 | Ehrlich | |
| 7,500,713 B2 | 3/2009 | Riley et al. | |
| 7,588,286 B2 | 9/2009 | Lewallen et al. | |
| 7,762,618 B2 | 7/2010 | Lewallen et al. | |
| 7,862,103 B2 | 1/2011 | Riley et al. | |
| 7,931,328 B2 | 4/2011 | Lewallen et al. | |
| 8,016,152 B2 * | 9/2011 | Roush ................... | B60P 7/0815 220/652 |
| 8,016,527 B2 | 9/2011 | Pattison et al. | |
| 8,506,221 B2 | 8/2013 | Pattison et al. | |
| 2011/0204678 A1 * | 8/2011 | Katz ................... | B62D 33/046 296/186.1 |

OTHER PUBLICATIONS

DuraPlate Vans Brochure, Wabash National Corporation, Jan. 2003, 6 pages.

* cited by examiner

*Primary Examiner* — Joseph D Pape
(74) *Attorney, Agent, or Firm* — Barnes & Thornburg LLP

(57) ABSTRACT

A logistics post for use in a vehicle includes an inner wall and an outer wall. The logistics post is arranged to couple with panels to form a sidewall of a vehicle. At least a portion of the inner wall is spaced apart from the outer wall to form a mount passage therebetween. The inner wall includes a plurality of logistics slots that extend through the inner wall and open into the mount passage.

19 Claims, 6 Drawing Sheets

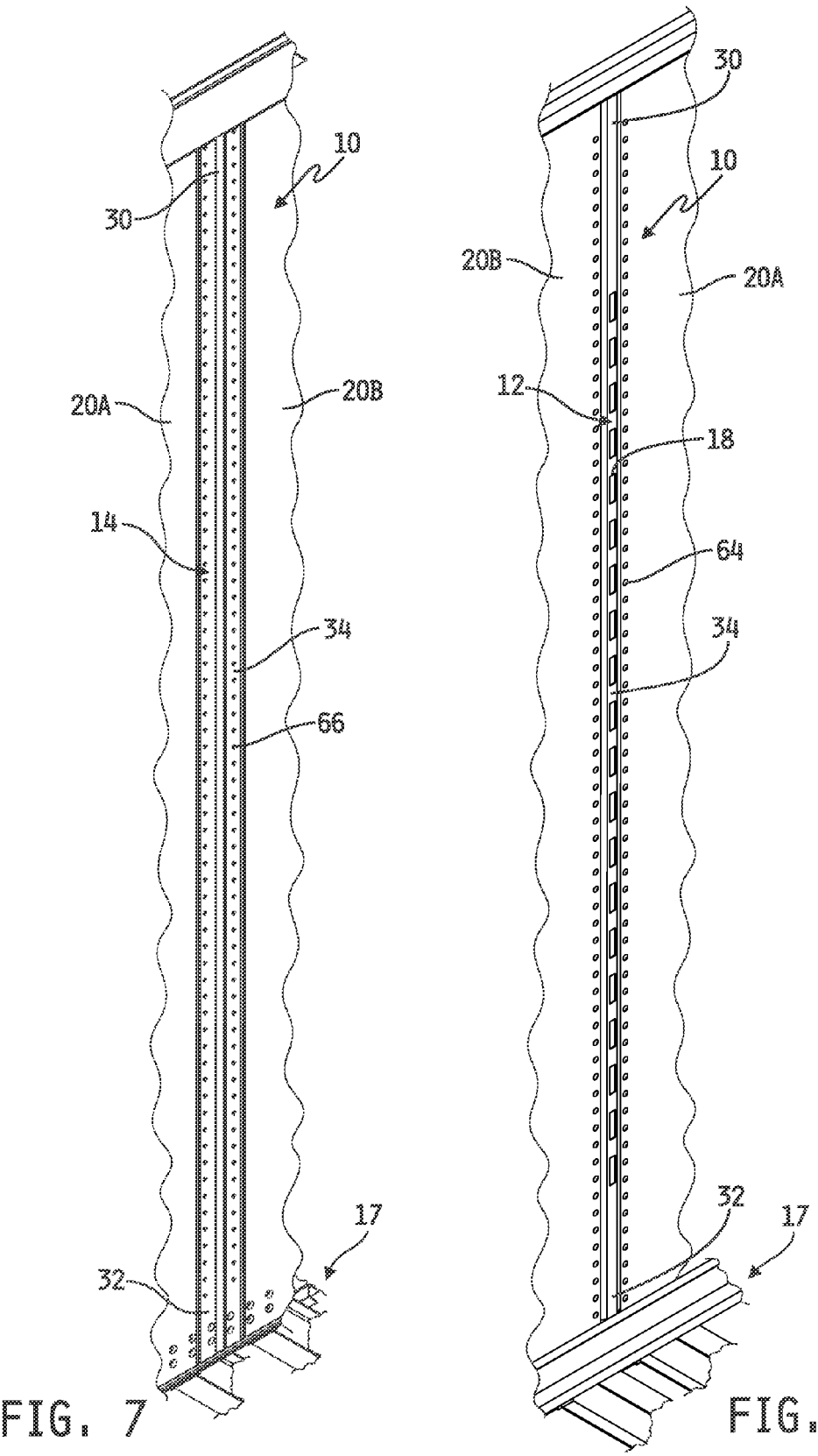

LOGISTICS POST

This application claims priority to and the benefit U.S. Provisional Patent Application No. 62/034,465, filed 7 Aug. 2014, the disclosure of which is now expressly incorporated herein by reference.

FIELD OF THE DISCLOSURE

The present disclosure relates generally to side walls of vehicles constructed of a plurality of panels, and more specifically to logistics posts used to join the panels to form a portion of the side walls of vehicles.

BACKGROUND

Logistics posts are used to support panels that form side walls of vehicles, such as semi-tractors, trucks, automobiles, or railway cars. Such vehicles may include for example semi-trailers, van-type trailers, flatbed or platform type trailers, container chassis and cargo containers. Logistics posts may include logistics slots that are arranged to receive fasteners that restrain cargo located inside the vehicle. Some logistics slots are located on an inner wall of the logistics post that faces an inside of the vehicle. The logistics post may include an outer wall that faces an outside of the vehicle to cover the inner wall and logistics slots to block undesirables such as, for example, rain from entering the inside of the trailer through the logistics slots. It is desirable to minimize the size of the logistics posts to maximize cargo space inside the vehicle and to reduce the cost and weight of the vehicle. Accordingly, there remains a need for further contributions in this area of technology, including contributions that reduce complexity, cost, and weight of applications.

SUMMARY

The present disclosure may comprise one or more of the following features recited in the attached claims and combinations thereof, and/or one or more of the following features and combination thereof.

In one aspect of the disclosure, an illustrative logistics post is disclosed. Further embodiments, forms, features, aspects, benefits, and advantages of the present application shall become apparent from the description and figures provided herewith.

Various illustrative embodiments of a logistics post are provided. In one illustrative aspect, the logistics post comprises and inner wall, an outer wall, and a joining member. The inner wall includes a first inner-wall end, a second inner-wall end, and a plurality of logistics slots that extend through the inner wall. The outer wall includes a first outer-wall end and a second outer-wall end. A portion of the inner wall extends away from the outer wall to form a mount passage therebetween. The logistics slots open into the mount passage. The outer wall overlaps with the inner wall to close the mount passage. The joining member includes a first joint end that extends from the second inner-wall end and a second joint end that extends from the first outer-wall end. The joining member couples together the inner wall with the outer wall.

In one aspect of the logistics post the inner wall, the outer wall, and the joining member are integrally formed.

In another illustrative aspect the inner wall, the outer wall, and the joining member are a single monolithic component.

In one illustratively aspect the inner wall includes an inner surface, an outer surface, and the logistics slots extend through the inner and outer surfaces.

In another aspect, the inner wall, the outer wall, and the joining member comprise at least one of a metallic, a non-metallic, and a ceramic material.

In one illustratively aspect, the inner wall, the outer wall, and the joining member may comprise a metallic material.

In another illustrative aspect the inner wall, the outer wall, and the joining member are steel.

In one illustrative aspect the joining member includes an inner coupler segment and an outer coupler segment and the outer coupler segment overlaps with the inner coupler segment.

In another aspect the inner coupler segment and the second inner-wall end illustratively are coupled together.

Illustratively, in one aspect, the inner coupler segment and the inner wall lie in a first plane. In yet another aspect the joining member further includes an S-curved segment, the S-curved segment and the outer coupler segment are coupled together and the S-curved segment and the first outer-wall end are coupled together.

In another illustrative aspect the joining member further includes an intermediate segment extending between and interconnecting the inner segment and the outer segment.

In another illustrative aspect the joining member is formed to define a gap between the inner and outer segments.

In an illustrative aspect the inner wall includes a front inner segment, a rear inner segment, and a mount segment extending between and interconnecting the front and rear segments.

In another illustrative aspect a front inner segment and the rear inner segments extend along the outer wall.

In one illustrative aspect the mount segment extends away from the outer wall to form a first receiver channel therebetween.

In an illustrative aspect the first receiver channel is about one fourth of an inch wide to about one-inch wide.

In another illustrative aspect the first receiver channel is about three fourths of an inch wide.

In still another illustrative aspect the first receiver channel is about one-half of an inch wide.

In an illustrative aspect the logistics slots extend through the mount segment.

In an illustrative aspect the logistics slots open into the first receiver channel.

In an illustrative aspect the logistics slots are aligned vertically.

In an illustrative aspect the mount segment is curved.

In an illustrative aspect the mount segment includes a first arm coupled to the front segment, a second arm coupled to the rear segment, and a receiver body extending between and interconnecting the first and second arms.

In an illustrative aspect the first arm and the front inner segment cooperate to define an angle $\alpha$ therebetween.

In an illustrative aspect the second arm and the rear inner segment cooperate to define an angle $\theta$ therebetween.

In one illustrative aspect the angle $\alpha$ and the angle $\theta$ may be about equal.

In another illustrative aspect the angle $\alpha$ and the angle $\theta$ are about equal.

In an illustrative aspect the receiver body lies in a second plane parallel to the first plane.

In an illustrative aspect the outer wall includes a front outer segment, a rear outer segment, and an expanded segment extending between and interconnecting the front and rear outer segments.

In an illustrative aspect the expanded segment extends away from the inner wall to form a second receiver channel therebetween.

In an illustrative aspect the second receiver channel opens into the first receiver channel and the first and second receiver channels cooperate to form a mount passage.

In an illustrative aspect the mount passage is about one-fourth of an inch wide to about one-inch wide.

In another illustrative aspect the mount passage is about three-fourths of an inch wide.

In yet another illustrative aspect the mount passage is about one-half of an inch wide.

In an illustrative aspect the front outer segment of the outer wall overlaps with the front inner segment of the inner wall.

In an illustrative aspect the rear outer segment of the outer wall overlaps with the rear inner segment of the inner wall.

In an illustrative aspect the logistics post further includes an end cap coupled together with the second outer-wall end.

In another illustrative aspect the end cap includes a first end coupled together with the second outer-wall end and a second end that abuts the first inner-wall end.

According to another illustrative aspect of the present disclosure, a side wall assembly for a vehicle comprises a first panel, a second panel, and a logistics post. The logistics post is coupled with the first panel and with the second panel. The logistics post includes an inner wall, an outer wall, and a joining member. The inner wall includes a first inner-wall end and a second inner-wall end. The outer wall includes a first outer-wall end and a second outer-wall end. The outer wall overlaps with the inner wall. The joining member is coupled with the inner and outer walls. The joining member includes a first coupler end that extends from the second inner-wall end of the inner wall and a second coupler end that extends from the first outer-wall end of the outer wall.

In one illustrative aspect of the side wall assembly the first panel is spaced apart from the second panel to form a gap therebetween and the logistics post extends across the gap to couple together the first panel and the second panel.

In a further illustrative aspect of the side wall assembly the inner wall includes an inner surface facing away from the outer wall and an outer surface facing toward the outer wall, the first panel is coupled together with the inner surface of the inner wall, and the second panel is coupled together with the inner surface of the inner wall The present disclosure includes an illustrative method of making a logistics post for use in a vehicle. The method comprises the step of providing a sheet of material. The method further comprises the step of forming an inner wall from the sheet of material to provide a first bent sheet. The inner wall includes a first inner-wall end and a second inner-wall end. The method further comprises the step of forming an outer wall from the sheet of material so that the outer wall over laps with the inner wall to provide a second bent sheet. The outer wall includes a first outer-wall end and a second outer-wall end. The method further comprises the step of forming a joining member from the sheet of material to provide a third bent sheet. The joining member includes a first coupler end that extends from the second inner-wall end of the inner wall and a second coupler end that extends from the first outer-wall end of the outer wall. The joining member couples together the inner and outer walls.

In one illustrative aspect, the components may be formed into a single monolithic component. In further illustrative aspects, the method may include making a logistic post for use in a vehicle according to any of the other illustrative aspects described and/or claimed herein.

These and other features of the present disclosure will become more apparent from the following description of the illustrative embodiments.

BRIEF DESCRIPTION OF THE DRAWINGS

FIG. 7 is a perspective view depicting an outer portion of the side wall of the semi-trailer with portions broken away; and FIG. 8 is a perspective view depicting an inner portion of the side wall of the semi-trailer with portions broken away.

Figure 1:
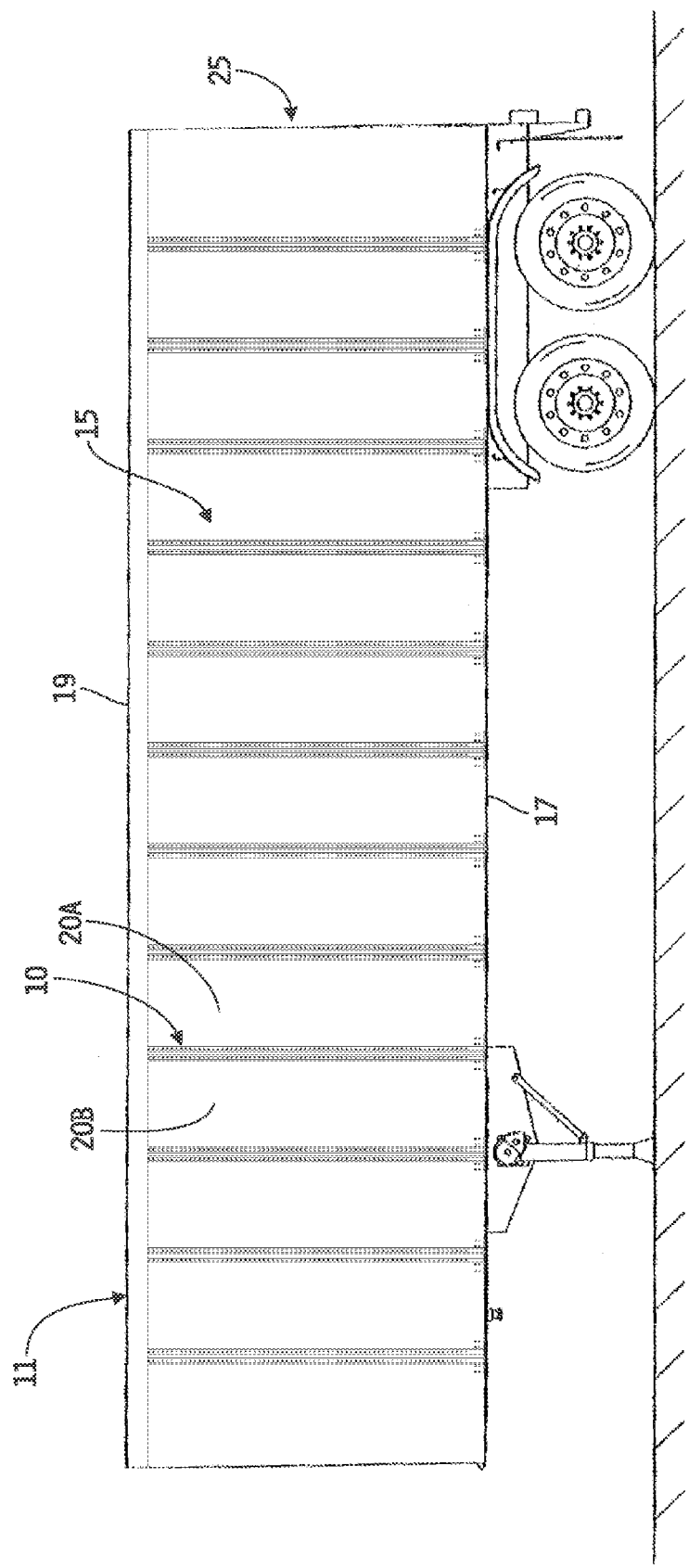
FIG. 1 is a side elevational view of a semi-trailer having a number of logistics posts employing features of the present disclosure.
Figure 2:
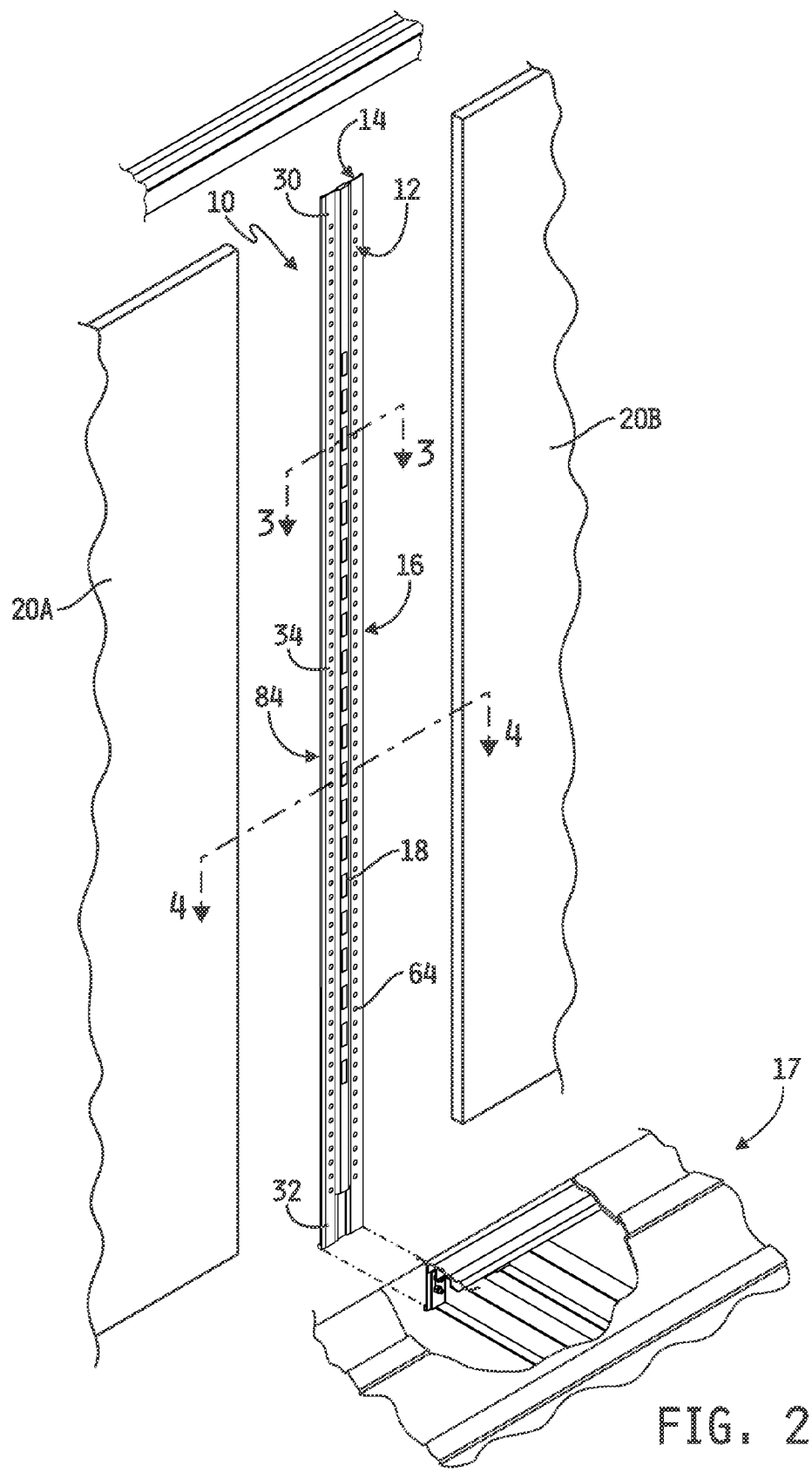
FIG. 2 is an exploded perspective view of a portion of the semi-trailer of FIG. 1 suggesting that each logistics post couples with panels, a floor, and a ceiling to form a side wall of the semi-trailer.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

For the purposes of promoting an understanding of the principles of the invention, reference will now be made to a number of illustrative embodiments shown in the attached drawings and specific language will be used to describe the same. While the concepts of this disclosure are described in relation to a logistics post for use in semi-trailers, it will be understood that they are equally applicable to other vehicles and side wall assemblies generally, and more specifically to logistics posts used with conventional box, van, or flatbed type trailers, examples of which include, but should not be limited to, straight truck bodies, small personal and/or commercial trailers and the like. Further, the concepts of this disclosure are similarly applicable for use with any type of vehicle where it is desired to reduce the complexity, cost, or weight of side walls of the vehicle.

FIG. 1 depicts a plurality of vertically extending logistics posts 10 used to construct a side wall 15 of a vehicle 11 such as, for example, semi-trailer 11. The logistics posts 10 are spaced apart horizontally along a length of the semi-trailer 11 and cooperate with panels 20 to construct the side wall 15. Each logistics post 10 is coupled with a floor 17 of the semi-trailer 11 at a lower end of the logistics post 10 and is coupled with a roof 19 of the semi-trailer 11 at an upper end of the logistics post 10. The panels 20 extend between the floor 17 and the roof 19 along a length of the semi-trailer 11. The logistics posts 10 couple with the panels 20 to construct the side wall 15. The roof 19, floor 17, and side walls 15 cooperate to define a storage region 25 arranged to receive and store cargo.

As shown in FIGS. 2-8, the logistics post 10 includes the upper end and the lower end spaced apart from the upper end. The logistics post 10 includes an upper attachment portion 30 located at the upper end, a lower attachment portion 32 located at the lower end, and a logistics portion 34 extending between the upper attachment portion 30 and the lower attachment portion 32. The upper attachment portion 30 is arranged to couple the logistics post 10 with the roof 19 of the semi-trailer 11. The lower attachment portion 32 is arranged to couple the logistics post 10 with the floor 17 of the semi-trailer 11. The logistics portion 34 couples with a first and second panel 20A, 20B to support the panels 20A, 20B. The logistics portion 34 also provides a retention feature for receiving fasteners such as, for example, straps, ropes, hooks, clamps, fittings, or any other suitable alternative used to secure cargo located in the storage region 25 during operation of the semi-trailer 11.

Figure 3:
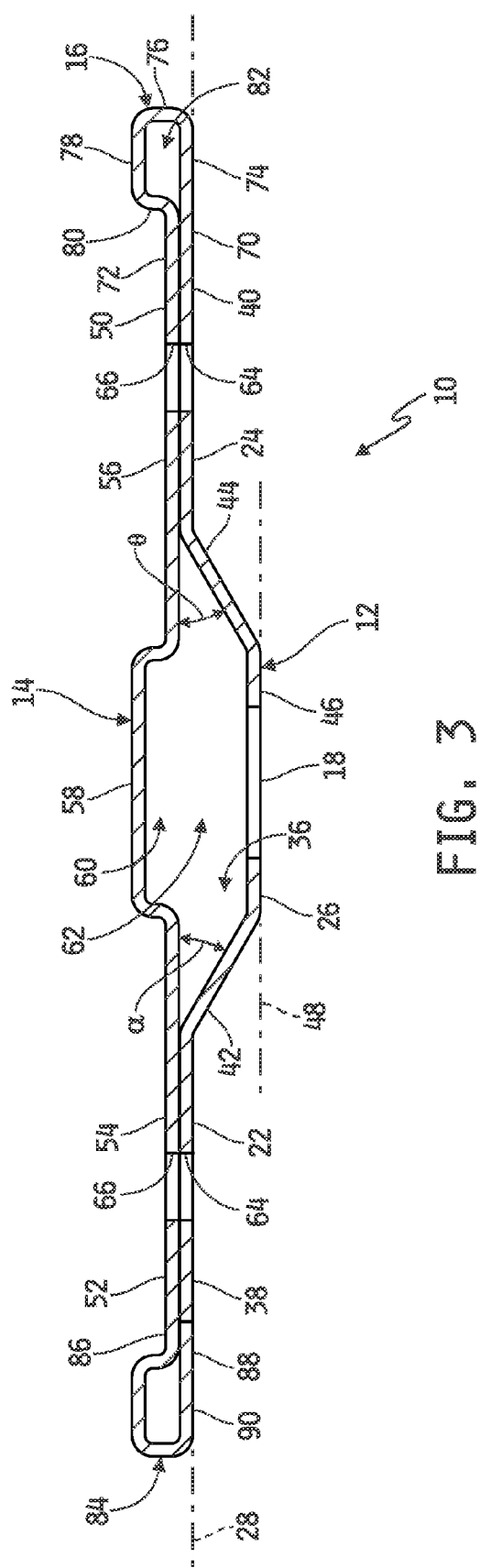
FIG. 3 is a top cut-away view of a logistics post of the present disclosure.

Each logistics post 10 includes an inner wall 12, an outer wall 14, and a joining member 16 as shown in FIG. 3. The inner and outer walls 12, 14 are coupled with the floor 17, roof 19, and panels 20 to provide structural support for the panels 20 and the roof 19. The joining member 16 couples the inner wall 12 with the outer wall 14. In the illustrative embodiment, the joining member 16 is integrally formed with inner wall 12 and outer wall 14. In particular, joining member 16, inner wall 12, and outer wall 14 are a single monolithic component.

Figure 4:
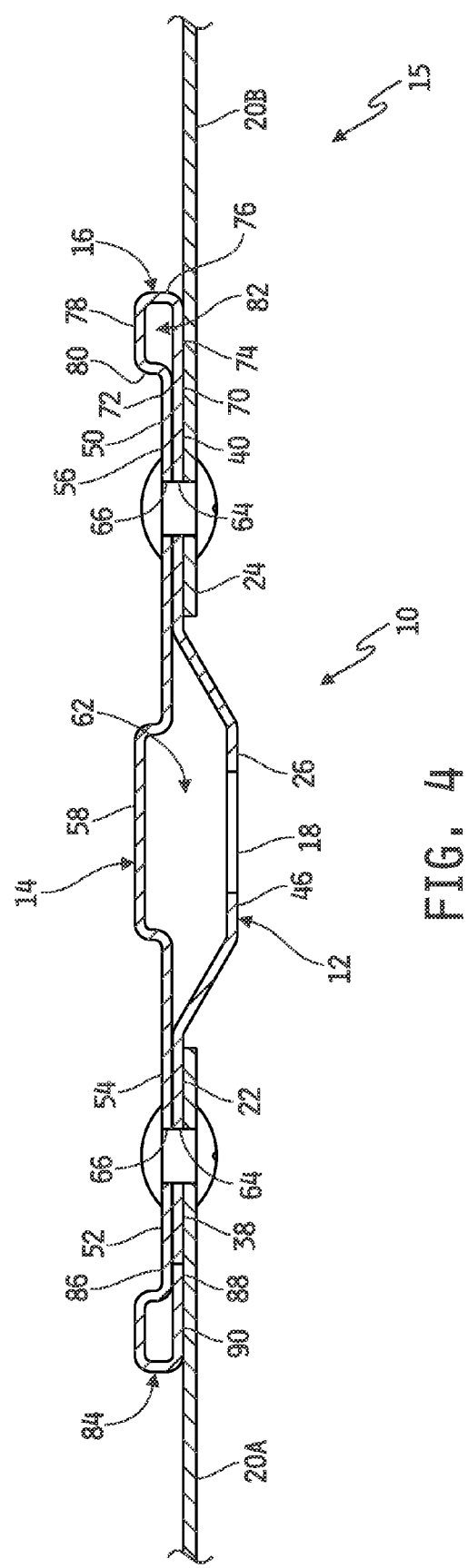
FIG. 4 is a top cut-away view of a logistics post of the present disclosure coupled with panels to form the side wall.

The inner wall 12 faces the storage region 25 of the semi-trailer 11 as shown in FIG. 4. A portion of the inner wall 12 is spaced apart from the outer wall 14 to form a mount passage 62 therebetween as shown in FIGS. 3 and 4. The inner wall 12 includes logistics slots 18 that open into the mount passage 62 to allow access into the mount passage from inside the semi-trailer 11. In the illustrative embodiment, the logistics slots 18 and mount passage 62 cooperate to provide the retention feature. The logistics slots 18 are arranged to receive fasteners that extend through a logistics slot 18 into the mount passage 62 and engage the inner wall 12. The outer wall 14 is continuous and blocks access into the mount passage 62 from outside of the semi-trailer 11 to block undesirables such as rain, for example, from entering the storage region 25 through the mount passage 62 and logistics slots 18.

The inner wall 12 has a first inner-wall end 38 and a second inner-wall end 40 spaced apart from the first inner-wall end 38 as shown in FIG. 3. The inner wall 12 includes a front inner segment 22, a rear inner segment 24, and a mount segment 26. The front inner segment 22 extends from the first inner-wall end 38 toward the second inner-wall end 40. The rear segment extends from the second inner-wall end 40 toward the first inner-wall end 38. The mount segment 26 extends between and interconnects the front and rear inner segments 22, 24.

The front inner segment 22 couples with the first panel 20A to support the first panel 20A and maintain the first panel 20A in position between the floor 17 and the roof 19 as shown in FIG. 1. In the illustrative embodiment, the front inner segment 22 includes a number of through-holes 64 that extend through the front inner segment 22. The through-holes 64 are sized to receive rivets that couple the front inner segment 22 with the first panel 20A. Illustratively, the through-holes 64 are aligned vertically between the upper and lower ends of the logistics post 10. In the illustrative embodiment, the front inner segment 22 is generally flat. The front inner segment 22 extends along the outer wall 14 and lies in a first plane 28.

The rear inner segment 24 couples with the second panel 20B to support the second panel 20B and maintain the second panel 20B in position between the floor and the ceiling of the semi-trailer 11. The rear inner segment 24 is substantially similar to the front inner segment 22. As such, the rear inner segment 24 is not discussed in detail.

In the illustrative embodiment, the mount segment 26 extends away from the outer wall 14 toward the storage region 25 to form a first receiver channel 36 located between the mount segment 26 and the outer wall 14 as shown in FIGS. 3 and 4. The logistics slots 18 extend through the mount segment 26 and open into the first receiver channel 36. In the illustrative embodiment, the logistics slots 18 are aligned vertically between the upper and lower ends of the logistics post 10. In the illustrative embodiment, the logistics slots 18 are rectangle shaped. In other embodiments, the logistics slots 18 may have any shape suitable to receive and retain fasteners.

The first receiver channel 36 is arranged to receive a portion of a fastener that extends through the logistics slot 18 and into the first receiver channel 36. The fastener engages the inner wall 12 to restrain cargo located in the storage region 25. In some embodiments, the first receiver channel 36 is about one-fourth of an inch to about one inch wide. In some embodiments, the first receiver channel 36 is about three-fourths of an inch wide. In other embodiments, the receiver channel is about one-half of an inch wide.

The mount segment 26 includes a first arm 42, a second arm 44, and a receiver body 46 as shown in FIGS. 3 and 4. The first and second arms 42, 44 extend away from the outer wall 14 to form the first receiver channel 36. The receiver body 46 extends between the first and second arms 42, 44 to close the first receiver channel 36. Illustratively, the first arm 42, the second arm 44, and the receiver body 46 are generally straight. In other embodiments, the first arm 42, the second arm 44, and the receiver body 46 may be curved.

The first arm 42 extends from the front inner segment 22 away from the first plane 28 toward the storage region 25 as shown in FIG. 4. An angle $\alpha$ is defined between the first arm 42 and the front inner segment 22. The second arm 44 extends from the rear inner segment 24 away from the first plane 28 toward the storage region 25. An angle $\theta$ is defined between the second arm 44 and the rear inner segment 24. In the illustrative embodiment, the angle $\alpha$ and the angle $\theta$ are about equal. In some embodiments, the angle $\alpha$ and the angle $\theta$ are between about 0 degrees and about 90 degrees. In the illustrative embodiment, the angle $\alpha$ and the angle $\theta$ are about 35 degrees.

The receiver body 46 is coupled with the first arm 42 and coupled with the second arm 44. The receiver body 46 lies in a second plane 48 that is parallel to the first plane 28. The logistics slots 18 extend through the receiver body 46.

The outer wall 14 faces toward an outside of the semi-trailer 11 away from the storage region 25 as shown in FIG. 1. The outer wall 14 overlaps with the inner wall 12 to close the mount passage 62 and to block access into the storage region 25 through mount passage 62 and logistics slots 18 as shown in FIGS. 3 and 4. The outer wall 14 blocks undesirables, such as rain, from entering the storage region 25.

The outer wall 14 has a first outer-wall end 50 and a second outer-wall end 52 spaced apart from the first outer-wall end 50 as shown in FIG. 3. The outer wall 14 includes a front outer segment 54, a rear outer segment 56, and an expanded segment 58. The front outer segment 54 extends from the first outer-wall end 50 toward the second outer-wall end 52. The rear outer segment 56 extends from the second outer-wall end 52 toward the first outer-wall end 50. The expanded segment 58 extends between and interconnects the front and rear segments 54, 56. In the illustrative embodiment, the front outer segment 54, the rear outer segment 56, and the expanded segment 58 are generally straight. In other embodiments, the front outer segment 54, the rear outer segment 56, and the expanded segment 58 are curved.

The front outer segment 54 couples with the front inner segment 22 of the inner wall 12 as shown in FIG. 3. The front outer segment 54 couples with the first panel 20A to support the first panel 20A and maintain the first panel 20A in position between the floor 17 and the roof 19 of the semi-trailer 11 as shown in FIG. 4. In the illustrative embodiment, the front outer segment 54 is generally straight. The front outer segment 54 extends along the front inner segment 22 of the inner wall 12.

Figure 5:
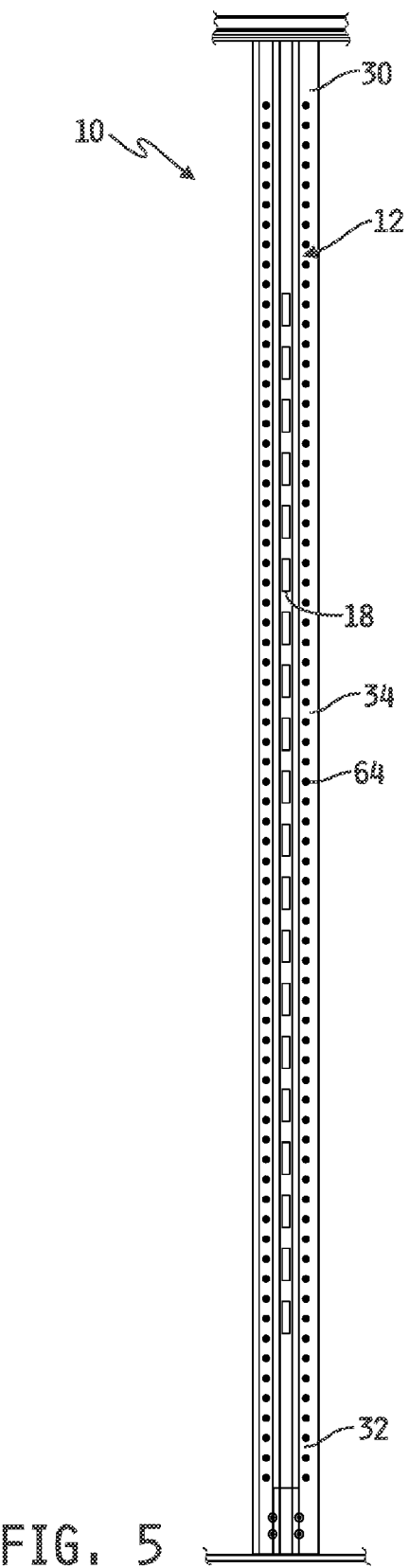
FIG. 5 is an elevation view depicting the inside wall of an illustrative logistics post.
Figure 6:
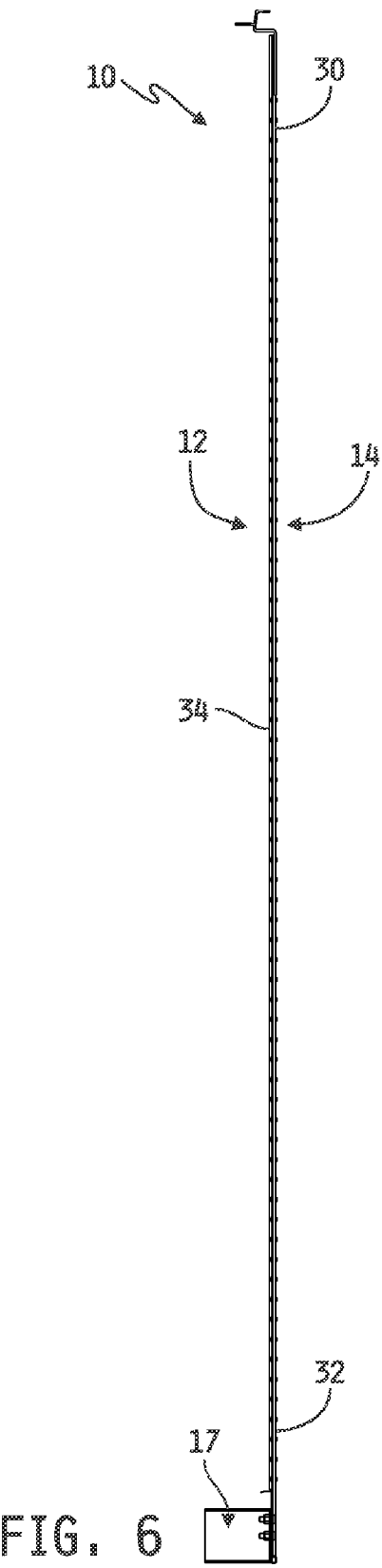
FIG. 6 is a side elevation view depicting an illustrative logistics post.

In the illustrative embodiment, the front outer segment 54 includes a number of through-holes 66 that extend through the front outer segment 54 as shown in FIGS. 3-5. The through-holes 66 are sized to receive rivets that couple the front outer segment 54 with the first panel 20A as shown in FIG. 4. Illustratively, the through holes 66 are aligned vertically between the upper and lower ends of the logistics post 10. The through-holes 66 are aligned with the through-holes 64 included in the front inner segment 22 of the inner wall 12.

The rear outer segment 56 couples with the rear inner segment 24 of the inner wall 12 as shown in FIG. 3. The rear outer segment 56 couples with the second panel 20B to support the second panel 20B and maintain the second panel 20B in position between the floor 17 and the roof 19 of the semi-trailer 11 as shown in FIG. 4. In the illustrative embodiment, the rear outer segment 56 is generally straight. The rear outer segment 56 extends along the rear inner segment 24 of the inner wall 12.

In the illustrative embodiment, the rear outer segment 56 includes a number of through-holes 66 that extend through the rear outer segment 56 as shown in FIGS. 3-5. The through-holes 66 are sized to receive rivets that couple the rear outer segment 56 with the second panel 20B. Illustratively, the through-holes 66 are aligned vertically between the upper and lower ends of the logistics post 10. The through-holes 66 are aligned with the through-holes 64 included in the rear inner segment 24 of the inner wall 12.

The expanded segment 58 is spaced apart from the mount segment 26 of the inner wall 12 to close the mount passage 62 and block access into the storage region 25 from outside of the semi-trailer 11 as shown in FIG. 4. In the illustrative embodiment, the expanded segment 58 extends outward away from the inner wall 12 to form a second receiver channel 60 located between the expanded segment 58 and the first plane 28. The second receiver channel 60 opens into the first receiver channel 36 to define the mount passage 62. In some embodiments, the mount passage 62 is about one-fourth of an inch to about one inch wide. In the illustrative embodiment, the mount passage 62 is about three-fourths of an inch wide. In other embodiments, the mount passage 62 is about one-half of an inch wide.

In other embodiments, the expanded segment 58 does not extend outward and the second receiver channel 60 is omitted. In such an embodiment, the mount passage 62 includes the first receiver channel 36.

The joining member 16 extends between and couples together the inner and outer walls 12, 14 as shown in FIG. 3. The joining member 16 has a first coupler end 70 and a second coupler end 72. The first coupler end 70 is coupled with and extends from the second inner-wall end 40. The second coupler end 72 is coupled with and extends from the first outer-wall end 50.

The joining member 16 includes an inner coupler segment 74, an intermediate coupler segment 76, an outer coupler segment 78, and an S-curved segment 80 as shown in FIGS. 3 and 4. The inner coupler segment 74 is arranged at the first coupler end 70 and couples together the joining member 16 to the inner wall 12. The inner coupler segment 74 is generally straight and lies in the first plane 28.

The intermediate coupler segment 76 is coupled together with the inner coupler segment 74 as shown in FIGS. 3 and 4. The intermediate coupler segment 76 extends away from the inner coupler segment 74 about perpendicular to the first plane 28.

The outer coupler segment 78 is coupled together with and extends from the intermediate coupler segment 76 as shown in FIGS. 3 and 4. The outer coupler segment 78 is about parallel with the inner coupler segment 74. The outer coupler segment 78 is spaced apart from the inner coupler segment 74 to define a gap 82 therebetween.

The S-curved segment 80 is arranged at the second coupler end 72. The s-curved segment 80 extends from and is coupled together with the outer coupler segment 78 as shown in FIGS. 3 and 4. The S-curved segment 80 is coupled together with the outer wall 14 at the first outer-wall end 50 of the outer wall 14.

In the illustrative embodiment, the logistics post 10 further includes an end cap 84 as shown in FIGS. 3 and 4. The end cap 84 covers the first inner-wall end 38 of the inner wall 12 and the second outer-wall end 52 of the outer wall 14 to block undesirables from entering the mount passage 62 from between the inner and outer walls 12, 14.

The end cap 84 has a first end 86, a second end 88, and a cap segment 90 that extends between the first and second ends 86, 88 as shown in FIGS. 3 and 4. The first end 86 of the end cap 84 is coupled with the second outer-wall end 52 of the outer wall 14. The second end 88 of the end cap 84 abuts the first inner-wall end 38 of the inner wall 12.

In the illustrative embodiment, the inner wall 12, the outer wall 14, the joining member 16, and the end cap 84 are integrally formed. In particular, the inner wall 12, the outer wall 14, the joining member 16, and the end cap 84 are a single monolithic component.

The inner wall 12 may comprise a metallic, a non-metallic, or a ceramic material. In the illustrative embodiment, the inner wall 12 is steel. The outer wall 14 may comprise a metallic, a non-metallic, or a ceramic material. In the illustrative embodiment, the outer wall 14 is steel. The joining member 16 may comprise a metallic, a non-metallic, or a ceramic material. In the illustrative embodiment, the joining member 16 is steel. The end cap 84 may comprise a metallic, a non-metallic, or a ceramic material. In the illustrative embodiment, the end cap 84 is steel.

A method of manufacturing a logistics post 10 may include a number of steps. In a first step, a sheet of material is provided. In a second step, inner wall 12 is formed from the sheet of material to provide a first bent sheet. For example, the inner wall 12 is formed by a roll forming process. The inner wall 12 includes a first inner-wall end 38 and a second inner-wall end 40. In a third step, outer wall 14 is formed from the first bent sheet so that the outer wall 14 over laps with the inner wall 12 to provide a second formed sheet. For example, the outer wall 14 is formed by a roll forming process. The outer wall 14 includes a first outer-wall end 50 and a second outer-wall end 52. In a fourth step, the joining member 16 is formed from the second bent sheet to provide a third bent sheet. For example, the joining member 16 is formed by a roll forming process. The joining member includes first coupler end 70 that extends from the second inner-wall end 40 and a second coupler end 72 that extends from the first outer-wall end 50. The joining member 16 couples together the inner and outer walls 12, 14 to form the logistics post 10.

In some embodiments, the method further includes a fifth step. In the fifth step, the logistics slots 18 are formed in the inner wall 12. In some embodiments, the method includes a sixth step. In the sixth step, the end cap 84 is formed from the third bent sheet.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A logistics post for use in a vehicle, the logistics post comprising:
   an inner wall that includes a first inner-wall end, a second inner-wall end, and a plurality of logistics slots that extend through the inner wall,
   an outer wall that includes a first outer-wall end and a second outer-wall end, wherein a portion of the inner wall extends away from the outer wall to form a mount passage therebetween, the logistics slots open into the mount passage, and the outer wall overlaps with the inner wall to close the mount passage, and
   a joining member that includes a first joint end that extends from the second inner-wall end and a second joint end that extends from the first outer-wall end and the joining member couples together the inner wall with the outer wall,
   wherein the inner wall, the outer wall, and the joining member are a single monolithic component.

2. The logistics post of claim 1 wherein the inner wall, the outer wall, and the joining member are integrally formed.

3. The logistics post of claim 1 wherein the inner wall includes an inner surface, an outer surface, and the logistics slots extend through the inner and outer surfaces; and wherein the inner wall, the outer wall, and the joining member comprise at least one of a metallic, a non-metallic, and a ceramic material.

4. The logistics post of claim 3 wherein the inner wall, the outer wall, and the joining member are steel.

5. The logistics post of claim 3 wherein the joining member includes an inner coupler segment and an outer coupler segment and the outer coupler segment overlaps with the inner coupler segment; and wherein the inner coupler segment and the second inner-wall end are coupled together.

6. The logistics post of claim 5 wherein the joining member further includes an S-curved segment, the S-curved segment and the outer coupler segment are coupled together and the S-curved segment and the first outer-wall end are coupled together; wherein the joining member further includes an intermediate segment extending between and interconnecting the inner segment and the outer segment; and wherein the joining member is formed to define a gap between the inner and outer segments.

7. The logistics post of claim 6 wherein the inner wall includes a front inner segment, a rear inner segment, and a mount segment extending between and interconnecting the front and rear segments; wherein the front inner segment and the rear inner segments extend along the outer wall; wherein the mount segment extends away from the outer wall to form a first receiver channel therebetween; and wherein the logistics slots extend through the mount segment.

8. The logistics post of claim 7 wherein the logistics slots open into the first receiver channel.

9. The logistics post of claim 8 wherein the logistics slots are aligned vertically; and wherein the mount segment is curved.

10. The logistics post of claim 9 wherein the mount segment includes a first arm coupled to the front segment, a second arm coupled to the rear segment, and a receiver body extending between and interconnecting the first and second arms; wherein the first arm and the front inner segment cooperate to define an angle α therebetween; wherein the second arm and the rear inner segment cooperate to define an angle θ therebetween; and wherein the inner coupler segment and the inner wall lie in a first plane.

11. The logistics post of claim 10 wherein the angle α and the angle θ are about equal.

12. The logistics post of claim 10 wherein the receiver body lies in a second plane parallel to the first plane.

13. The logistics post of claim 12 wherein the outer wall includes a front outer segment, a rear outer segment, and an expanded segment extending between and interconnecting the front and rear outer segments; wherein the expanded segment extends away from the inner wall to form a second receiver channel therebetween; and wherein the second receiver channel opens into the first receiver channel and the first and second receiver channels cooperate to form a mount passage.

14. The logistics post of claim 13 further including an end cap coupled together with the second outer-wall end; wherein the end cap includes a first end coupled together with the second outer-wall end and a second end that abuts the first inner-wall end; wherein the front outer segment of the outer wall overlaps with the front inner segment of the inner wall; and wherein the rear outer segment of the outer wall overlaps with the rear inner segment of the inner wall.

15. The logistics post of claim 14 wherein the first receiver channel is about one fourth of an inch wide to about one-inch wide; and wherein the mount passage is about one-fourth of an inch wide to about one-inch wide.

16. A logistics post for use in a vehicle, the logistics post comprising:
   an inner wall that includes a first inner-wall end, a second inner-wall end, and a plurality of logistics slots that extend through the inner wall,
   an outer wall that includes a first outer-wall end and a second outer-wall end, wherein the inner wall and the outer wall cooperate to form a mount passage therebetween, the logistics slots open into the mount passage, and the outer wall overlaps with the inner wall to close the mount passage, and
   a joining member that includes a first joint end that extends from the second inner-wall end of the inner wall and a second joint end that extends from the first outer-wall end of the outer wall to join together the inner wall, the outer wall, and the joining member to form a single monolithic component.

17. The logistics post of claim 16 wherein the joining member includes an inner coupler segment and an outer coupler segment, the outer coupler segment overlaps with the inner coupler segment, and the inner coupler segment and the second inner-wall end are coupled together.

18. The logistics post of claim 17 wherein the joining member further includes an S-curved segment, the S-curved segment and the outer coupler segment are coupled together, the S-curved segment and the first outer-wall end are coupled together, the joining member further includes an intermediate segment extending between and interconnecting the inner coupler segment and the outer coupler segment, and the joining member is formed to define a gap between the inner and outer coupler segments.

19. The logistics post of claim 16 wherein the inner wall includes a front inner segment, a rear inner segment, and a mount segment extending between and interconnecting the front and rear inner segments, the front inner segment and the rear inner segment extend along the outer wall, the mount segment extends away from the outer wall to form a first receiver channel therebetween, and the logistics slots extend through the mount segment.

\* \* \* \* \*